United States Patent
Monda et al.

(10) Patent No.: US 12,485,076 B2
(45) Date of Patent: Dec. 2, 2025

(54) LIQUID HAIR DYE COMPOSITION

(71) Applicant: KAO CORPORATION, Tokyo (JP)

(72) Inventors: Keiji Monda, Katsushikak-ku (JP); Masahiko Watanabe, Sumida-ku (JP)

(73) Assignee: KAO CORPORATION, Tokyo (JP)

(*) Notice: Subject to any disclaimer, the term of this patent is extended or adjusted under 35 U.S.C. 154(b) by 992 days.

(21) Appl. No.: 17/440,418

(22) PCT Filed: Dec. 24, 2019

(86) PCT No.: PCT/JP2019/050546
§ 371 (c)(1),
(2) Date: Sep. 17, 2021

(87) PCT Pub. No.: WO2020/188936
PCT Pub. Date: Sep. 24, 2020

(65) Prior Publication Data
US 2022/0151897 A1    May 19, 2022

(30) Foreign Application Priority Data
Mar. 19, 2019 (JP) ................... 2019-051356

(51) Int. Cl.
*A61K 8/44* (2006.01)
*A61K 8/22* (2006.01)
(Continued)

(52) U.S. Cl.
CPC ............... *A61K 8/44* (2013.01); *A61K 8/22* (2013.01); *A61K 8/345* (2013.01); *A61K 8/36* (2013.01);
(Continued)

(58) Field of Classification Search
CPC . A61K 8/44; A61K 8/22; A61K 8/345; A61K 8/36; A61K 8/416; A61K 8/463;
(Continued)

(56) References Cited

U.S. PATENT DOCUMENTS 5,242,494 A * 9/1993 Callaghan ............ C04B 28/26
501/83
7,083,655 B2 8/2006 Pratt et al.
(Continued)

FOREIGN PATENT DOCUMENTS

EP    2 883 530 A1    6/2015
EP    3 427 720 A1    1/2019
(Continued)

OTHER PUBLICATIONS

William G. Griffin, "Classification of Surface-Active Agents by HLB", Journal of Cosmetic Science, Oct. 11, 1949, pp. 311-326, 16 pages.

Reference obtained through the Internet: "How to stain hair safely? How to choose a hair dye? Illustration by the doctor", Medpartner, Jul. 26, 2018 (with unedited computer-generated English translation), 8 pages.
International Search Report issued on Mar. 24, 2020 in PCT/JP2019/050546 filed on Dec. 24, 2019, 2 pages.
(Continued)

*Primary Examiner* — Blessing M Fubara
(74) *Attorney, Agent, or Firm* — Oblon, McClelland, Maier & Neustadt, L.L.P.

(57) ABSTRACT

A liquid hair dye composition comprising components (A), (B) and (C), wherein a content of the component (A) is 1.5 mass % or more, (A) an azo dye selected from the group consisting of the following formulae (A-1), (A-2) and (A-3); (B) a surfactant with an HLB of 7 or more, selected from the group consisting of anionic surfactants, nonionic surfactants and amphoteric surfactants; and (C) water.

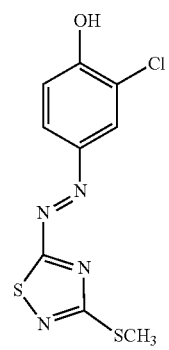

(A-1)

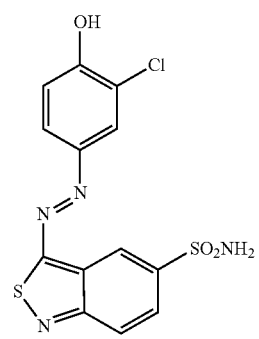

(A-2)

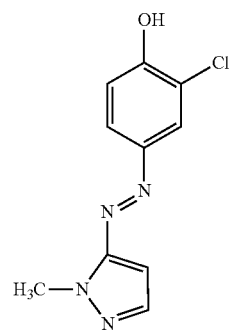

(A-3)

12 Claims, No Drawings

(51) Int. Cl.
*A61K 8/34* (2006.01)
*A61K 8/36* (2006.01)
*A61K 8/41* (2006.01)
*A61K 8/46* (2006.01)
*A61K 8/86* (2006.01)
*A61Q 5/06* (2006.01)
*A61Q 5/10* (2006.01)

(52) U.S. Cl.
CPC .............. *A61K 8/416* (2013.01); *A61K 8/463* (2013.01); *A61K 8/86* (2013.01); *A61Q 5/065* (2013.01); *A61Q 5/10* (2013.01); *A61K 2800/30* (2013.01); *A61K 2800/4322* (2013.01); *A61K 2800/4324* (2013.01); *A61K 2800/591* (2013.01)

(58) Field of Classification Search
CPC .................. A61K 8/86; A61K 2800/30; A61K 2800/4322; A61K 2800/4324; A61K 2800/591; A61Q 5/065
See application file for complete search history.

(56) References Cited

U.S. PATENT DOCUMENTS

| | | | |
|---|---|---|---|
| 7,651,538 B2* | 1/2010 | Yamaguchi | C09B 29/14 8/405 |
| 10,470,990 B2* | 11/2019 | Saimiya | A61Q 5/10 |
| 10,478,389 B2* | 11/2019 | Nojiri | A61K 8/49 |
| 10,485,747 B2* | 11/2019 | Nojiri | A61K 8/8152 |
| 11,077,042 B2* | 8/2021 | Abo | A61K 8/19 |
| 11,077,043 B2* | 8/2021 | Abo | A61K 8/345 |
| 11,083,678 B2* | 8/2021 | Monda | A61Q 5/10 |
| 11,083,680 B2* | 8/2021 | Watanabe | A61K 8/19 |
| 2017/0196791 A1 | 7/2017 | Nojiri | |
| 2017/0196792 A1* | 7/2017 | Nojiri | A61Q 5/10 |
| 2017/0273883 A1 | 9/2017 | Marsh et al. | |
| 2018/0369103 A1 | 12/2018 | Owens et al. | |
| 2020/0281832 A1 | 9/2020 | Abo et al. | |
| 2020/0281833 A1 | 9/2020 | Watanabe et al. | |
| 2020/0289390 A1 | 9/2020 | Abo et al. | |

FOREIGN PATENT DOCUMENTS

| | | |
|---|---|---|
| JP | 2010-24158 A | 2/2010 |
| JP | 2015-229667 A | 12/2015 |
| JP | 2015-229668 A | 12/2015 |
| JP | 2015-229670 A | 12/2015 |
| JP | 2016-11297 A | 1/2016 |
| JP | 2016-11298 A | 1/2016 |
| JP | 2019-55944 A | 4/2019 |
| JP | 2019-55945 A | 4/2019 |
| JP | 2019-55946 A | 4/2019 |
| RU | 2 493 814 C1 | 9/2013 |
| WO | WO 2015/188816 A1 | 12/2015 |
| WO | WO 2017/082267 A1 | 5/2017 |
| WO | WO 2018/087203 A1 | 5/2018 |

OTHER PUBLICATIONS

Kao, "Anti-Brassiness Hair Colour Supplement", Mintel GNPD, 2017, [retrieval date Mar. 13, 2020], ID:4854927, online https://portal.mintel.com/, pp. 1-4.

Kao, "Hair Color Supplement", Mintel GNPD, 2018, [retrieval date Mar. 13, 2020], ID:5730273, online https://portal.mintel.com/, pp. 1-4.

Kao, "Blonde Perfecting Treatment", Mintel GNPD, 2018, [retrieval date Mar. 13, 2020], ID:5815653, online https://portal.mintel.com/, pp. 1-4.

Extended European Search Report issued Jul. 20, 2023 in European Patent Application No. 19919756.7, 10 pages.

* cited by examiner

LIQUID HAIR DYE COMPOSITION

FIELD OF THE INVENTION

The present invention relates to a liquid hair dye composition.

BACKGROUND OF THE INVENTION

Hair dye compositions can be classified by dyes to be used, or the presence or absence of the action of bleaching on melanin. Typical examples thereof include: a two-part permanent hair dye composition composed of a first part containing an alkali agent and an oxidation dye intermediate and a second part containing an oxidizing agent; and a one-part semipermanent hair dye composition containing an organic acid or alkali agent, and at least one direct dye such as an acidic dye, a basic dye and a nitro dye.

A permanent hair dye composition has an excellent aspect that the dye penetrates into a deep portion of hair and finishes uniform dyeing from the core to the surface of hair, so that the dyed color hardly fades and the hair dyeing effect is kept, whereas the permanent hair dye composition has a problem that the color tone imparted by an oxidation dye is not so bright. In addition, some direct dyes such as nitro dyes produce bright colors, but fading of dyed hair color becomes more remarkable as time advances. Thus, a method for obtaining a brighter color in a permanent hair dye composition by combined use of a direct dye with an oxidation dye has been proposed (e.g., Patent Literature 1).

However, the number of direct dyes stable against an alkali agent or an oxidizing agent contained in permanent hair dyes is small; and some of them cause decomposition or deposits during storage, sometimes significantly reducing the hair dyeability. Thus, a method has been proposed in which a direct dye is contained in a separate composition from a first part containing an alkali agent or a second part containing an oxidizing agent, and the separate composition is mixed with the first part and the second part immediately before use and the mixture is applied to hair (Patent Literature 2).

(Patent Literature 1) JP-A-2010-024158
(Patent Literature 2) WO 2018/087203

SUMMARY OF THE INVENTION

The present invention provides a liquid hair dye composition comprising components (A), (B) and (C), wherein a content of the component (A) is 1.5 mass % or more,
(A) one or more azo dyes selected from the group consisting of the following formulae (A-1), (A-2) and (A-3):

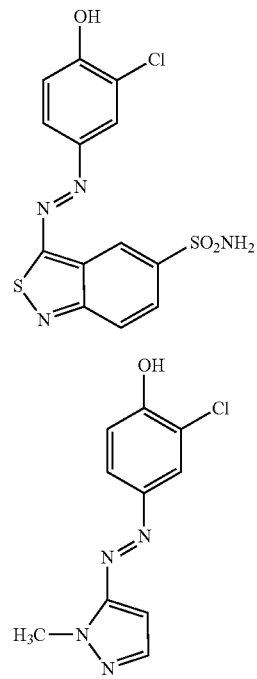

(B) one or more surfactants with an HLB of 7 or more, selected from the group consisting of anionic surfactants, nonionic surfactants and amphoteric surfactants; and
(C) water.

Further, the present invention provides a method for use of the liquid hair dye composition, wherein the liquid hair dye composition is mixed with an additional preparation to adjust a hair dyeing color, and then used for hair dyeing.

DETAILED DESCRIPTION OF THE EMBODIMENT

In the case of conducting color toning by mixing, in which a direct dye is mixed with an additional preparation immediately before use and applied to hair, when a hair dye with a low concentration of direct dye is mixed, the concentration of a dye itself in a composition after mixing is likely to be low; and therefore, causing drawbacks that: a color obtained by hair dyeing would be different from an intended color and it is difficult to predict a hair color after hair dyeing. In order to enhance the predictability of the color of the dyed hair before mixing for the color toning, it is necessary to use, as the above-described separate composition from the first part and the second part, a small amount of hair dye with a higher concentration of direct dye in which even a small amount to be added thereof enables color toning for various color developments or color intensities.

Further, the azo dye disclosed in Patent Literature 2 has a low solubility in water or various solvents; in an attempt to formulate the azo dye in a composition at a higher concentration, it would disadvantageously cause deposits during storage; and therefore, use of a large amount of solvent such as diols for a specific direct dye to improve the storage stability has been proposed. However, in the case that a large amount of solvent is added, a dye would be excessively and stably dissolved in the solvent; and, as a result, it has been found that there exist problems: the dye is less fed into hair and the hair dyeability is easily deteriorated.

Meanwhile, the present inventors found that when being mixed with a permanent hair dye for hair dyeing, application of the azo dye to hair at a high concentration allows the azo dye to permeate into a specific portion of hair and allows the hair to be dyed in two layers of hues, so that the hue or color tone of hair appearance is varied in accordance with the angle for viewing the hair, which is an unprecedented effect (see, for example, Japanese Patent Application No. 2018-175683).

Thus, the present invention relates to a liquid hair dye composition, which does not cause deposits of an azo dye during storage though containing the azo dye at a high concentration, and provides an excellent hair dyeability. In addition, the present invention relates to a liquid hair dye composition, which: can sufficiently produce such an effect that the hue or color tone of hair appearance is varied in accordance with the angle for viewing the hair by mixing with a permanent hair dye and dyeing the hair; and further, can easily predict a hair color after dyeing at the time of color toning by mixing with the permanent hair dye.

As a result of intensive studies, the present inventors found that the solubility of the azo dye can be significantly improved by allowing the azo dye to coexist with one or more surfactants with a specific HLB, selected from the group consisting of anionic surfactants, nonionic surfactants and amphoteric surfactants, thereby completing the present invention.

Definition

In the present invention, a form of liquid means a state of a substance determined as "liquid" by a test for determining whether a material is liquid or solid based on "ASTM D 4359-90: Standard Test Method for Determining Whether a Material is a Liquid or Solid" and it includes a cream-like form, a gel-like form, and others.

[Component (A): Azo Dye]

The liquid hair dye composition of the present invention comprises, as the component (A), one or more azo dyes selected from the group consisting of the following formulae (A-1), (A-2) and (A-3).

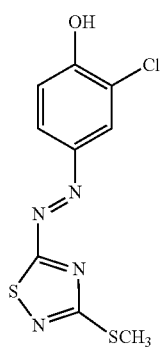

(A-1)

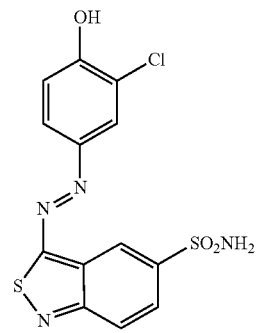

(A-2)

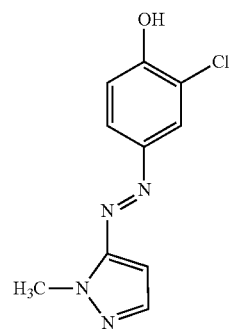

(A-3)

The content of the component (A) in the liquid hair dye composition of the present invention is, from the viewpoint of imparting a good hair dyeability, the viewpoint of producing a hair dyeing effect in which the hue or color tone of hair appearance varies in accordance with the angle for viewing the hair; and the viewpoint of facilitating the color toning with the prediction of the color of dyed hair, 1.5 mass % or more, preferably 1.6 mass % or more, more preferably 1.7 mass % or more, and further preferably 1.8 mass % or more; and from the viewpoints of imparting good solubility of the component (A) and good storage stability, preferably 10.0 mass % or less, more preferably 9.0 mass % or less, further preferably 8.5 mass % or less, further preferably 8.0 mass % or less, and also in view of the economic efficiency, further preferably 7.18 mass % or less, further preferably 7.0 mass % or less, further preferably 6.5 mass % or less, further preferably 6.0 mass % or less, further preferably 5.71 mass % or less, and further preferably 5.5 mass % or less.

[Component (B): Surfactant with an HLB of 7 or More]

The component (B) is one or more surfactants with an HLB of 7 or more, selected from the group consisting of anionic surfactants, nonionic surfactants and amphoteric surfactants.

Among these surfactants, one or more surfactants with an HLB of 7 or more, selected from the group consisting of anionic surfactants and nonionic surfactants are preferred from the viewpoint of improving the solubility of the component (A) and imparting good storage stability, the viewpoint of producing an effect in which the hue or color tone of hair appearance is varied in accordance with the angle for viewing the hair, and the viewpoint of facilitating the color toning with the prediction of a hair color after dyeing.

The HLB of the component (B) is, from the viewpoint of improving the solubility of the component (A) and imparting good storage stability, the viewpoint of producing an effect in which the hue or color tone of hair appearance varies in accordance with the angle for viewing the hair, and the viewpoint of facilitating the color toning with the prediction of the color of dyed hair, 7 or more, preferably 7 or more and 50 or less, and more preferably 7 or more and 40 or less. In the present invention, the HLB refers to a value calculated in accordance with the equation described below from the number of groups defined for each functional group by Davies' method (see, for example, Toshiyuki Suzuki, SHIKIZAI (Journal of the Japan Society of Color Material), 77[10], 564-469 (2004)).

$$HLB=7+\Sigma(\text{number of hydrophilic group})+\Sigma(\text{number of lipophilic group})$$

Examples of anionic surfactants include sulfate, sulfonate, carboxylate and phosphate-type anionic surfactants. More specifically, from the viewpoint of improving the solubility of the component (A) and the storage stability to obtain good hair dyeability, preferred are one or more selected from the group consisting of alkyl or alkenyl sulfates, alkyl or alkenyl ether sulfates, alkyl or alkenyl ether carboxylates and N-acyl amino acid salts; further preferred are one or more selected from the group consisting of alkyl or alkenyl ether sulfates and N-acyl amino acid salts; and further preferred are one or more selected from N-acyl amino acid salts.

From the viewpoint of improving the solubility of the component (A) and the storage stability to obtain good hair dyeability, as an alkyl group or an alkenyl group of the alkyl or alkenyl sulfates, preferred are linear or branched alkyl groups or alkenyl groups having from 8 to 20 carbon atoms, more preferred are linear or branched alkyl groups or alkyl groups having from 10 to 18 carbon atoms, and further preferred are linear alkyl groups having from 12 to 14 carbon atoms. These may be used alone or in combination of two or more. In particular, from the above points, preferred are one or more selected from the group consisting of lauryl sulfates, myristyl sulfates, cetyl sulfates, stearyl sulfates and oleyl sulfates; more preferred are one or more selected from the group consisting of lauryl sulfates and myristyl sulfates; and further preferred are lauryl sulfates.

From the viewpoint of improving the solubility of the component (A) and the storage stability to obtain good hair dyeability, as an alkyl group of the alkyl or alkenyl ether sulfates, preferred are linear or branched alkyl groups or alkenyl groups having from 8 to 20 carbon atoms; more preferred are linear or branched alkyl groups or alkenyl groups having from 10 to 18 carbon atoms; and further preferred are linear alkyl groups having from 12 to 14 carbon atoms.

As the alkyl or alkenyl ether sulfates, polyoxyethylene alkyl or alkenyl ether sulfates are preferred, wherein a polyoxyethylene thereof has an average number of added moles of, from the above viewpoint, preferably from 0.5 to 10, more preferably from 0.5 to 5, further preferably from 0.5 to 4, and further preferably from 0.5 to 2. These may be used alone or in combination of two or more. In particular, from the above viewpoint, preferred are one or more selected from the group consisting of polyoxyethylene (1) lauryl ether sulfates, polyoxyethylene (1) myristyl ether sulfates, polyoxyethylene (2) lauryl ether sulfates, polyoxyethylene (2) myristyl ether sulfates, polyoxyethylene (3) lauryl ether sulfates and polyoxyethylene (3) myristyl ether sulfates; more preferred are one or more selected from the group consisting of polyoxyethylene (1) myristyl ether sulfates, polyoxyethylene (2) lauryl ether sulfates and polyoxyethylene (3) lauryl ether sulfates; and further preferred are polyoxyethylene (2) lauryl ether sulfates.

From the viewpoint of improving the solubility of the component (A) and the storage stability to obtain good hair dyeability, an alkyl group or alkenyl group of the alkyl or alkenyl ether carboxylates is preferably a linear or branched alkyl group or alkenyl group having from 12 to 16 carbon atoms, more preferably a linear or branched alkyl group having from 12 to 14 carbon atoms, and further preferably a linear alkyl group having from 12 to 14 carbon atoms. In addition, as the alkyl or alkenyl ether carboxylates, preferred are polyoxyethylene alkyl or alkenyl ether carboxylates, wherein, from the same viewpoint as above, a polyoxyethylene thereof has an average number of added moles of preferably from 1 to 10, and more preferably from 2 to 5. These may be used alone or in combination with two or more. In particular, from the above viewpoint, the alkyl or alkenyl ether carboxylates include preferably one or more selected from the group consisting of polyoxyethylene lauryl ether carboxylates, polyoxyethylene myristyl ether carboxylates, and polyoxyethylene palmityl ether carboxylates; preferably one or more selected from the group consisting of polyoxyethylene lauryl ether carboxylates and polyoxyethylene myristyl ether carboxylates; and further preferably polyoxyethylene lauryl ether carboxylates.

From the viewpoint of improving the solubility of the component (A) and the storage stability to obtain good hair dyeability, an acyl group of the N-acyl amino acid salts is preferably one derived from a fatty acid having a saturated or unsaturated linear or branched chain having from 10 to 18 carbon atoms; more preferably one derived from a fatty acid having a saturated or unsaturated linear or branched chain having from 12 to 16 carbon atoms; and further preferably one derived from a fatty acid having a saturated or unsaturated linear or branched chain having from 12 to 14 carbon atoms. Among these fatty acids, from the same viewpoint as above, preferred are one or more selected from the group consisting of lauric acid, myristic acid, palmitic acid and oleic acid; and more preferred is lauric acid. In addition, an acyl group of the N-acyl amino acid may be one derived from mixed fatty acids of the above fatty acids, for example, one obtained by using coconut oil, palm kernel oil or the like as a raw material. In particular, preferred are those obtained by using coconut oil fatty acid or palm kernel fatty acid as a raw material; and more preferred are those obtained by using coconut oil fatty acid as a raw material.

From the viewpoint of improving the solubility of the component (A) and the storage stability to obtain good hair dyeability, an amino acid moiety of the N-acyl amino acid salts is preferably a neutral amino acid selected from the group consisting of glycine and alanine, and an acidic amino acid selected from the group consisting of glutamic acid and aspartic acid; more preferred is an acidic amino acid; and further preferred is glutamic acid. In addition, these amino acid moieties may be any of a D-form, an L-form and a mixture of D-form and L-form, preferably an L-form.

The N-acyl amino acid salts may be used alone or in combination of two or more. Among them, from the above viewpoint, the N-acyl amino acid salts include preferably one or more selected from the group consisting of N-lauroyl glutamates, N-myristoyl glutamates, N-cocoyl glutamates and N-lauroyl aspartates; more preferably one or more selected from the group consisting of N-lauroyl glutamates, N-myristoyl glutamates and N-cocoyl glutamates; and further preferably N-cocoyl glutamates.

Examples of salts that constitute these suitable anionic surfactants include alkali metals such as sodium and potassium; alkaline-earth metals such as calcium and magnesium; ammonium; and salts formed by organic ammonium derived from monoethanol amine, diethanol amine, triethanol amine, or the like. In particular, from the viewpoint of the commercial availability, alkali metal salts and ammonium salts are preferred.

Examples of the nonionic surfactants include; alkyl or alkenyl polyglucosides having an alkyl or alkenyl group with from 8 to 18 carbon atoms, and from 1 to 5 glucoside units; sorbitan esters such as polyethylene glycol sorbitan stearic acid, palmitic acid, myristic acid and lauric acid ester; fatty acid polyglycol esters; a polycondensate of ethylene oxide and propylene oxide commercially available under the trade name of "Pluronic (registered trademark)"; and polyoxyethylene alkyl or alkenyl ethers.

Among the nonionic surfactants, from the viewpoint of improving the stability under an alkaline condition and the solubility of the component (A), preferred are polyoxyethylene alkyl or alkenyl ethers. The alkyl group or alkenyl group of the polyoxyethylene alkyl or alkenyl ethers is preferably a linear or branched alkyl group or alkenyl group having from 10 to 22 carbon atoms, more preferably a linear or branched alkyl group or alkenyl group having from 12 to 20 carbon atoms; further preferably a branched alkyl group having from 12 to 20 carbon atoms and a linear alkenyl group having from 12 to 20 carbon atoms.

Further, the polyoxyethylene of the polyoxyethylene alkyl or alkenyl ethers has an average number of added moles, from the above viewpoint, preferably from 15 to 200, more preferably from 18 to 150, and further preferably from 20 to 60. More specifically, preferred are one or more selected from the group consisting of Laureth-23, Ceteth-25, Isoceteth-20, Ceteth-40, Octyldodeceth-25, Oleth-50, Beheneth-30 and Ceteth-150; more preferred are one or more selected from the group consisting of Laureth-23, Ceteth-25, Isoceteth-20, Ceteth-40, Octyldodeceth-25 and Oleth-50; and further preferred are one or more selected from the group consisting of Isoceteth-20, Octyldodeceth-25 and Oleth-50.

As amphoteric surfactants, preferred are various known betaines such as alkyl betaines, fatty acid amido alkyl betaines, and sulfobetaines like laurylhydroxysulfobetaine, long-chain alkyl amino acids such as cocoaminoacetate, cocoaminopropionate, sodium cocoamphopropionate, and sodium cocoamphoacetate.

Among the amphoteric surfactants, from the viewpoint of improving the stability under an alkaline condition and the solubility of the component (A), and the viewpoint of improving the hair dyeability, fatty acid amido alkyl betaines are preferred. The carbon number of the fatty acid group of the fatty acid amido alkyl betaines is preferably from 8 to 22, more preferably from 8 to 18, and further preferably from 10 to 14. The carbon number of the alkyl group of the fatty acid amido alkyl betaines is preferably from 2 to 6, and more preferably from 2 to 4. Specifically, lauramidopropyl betaine is preferred.

The content of the compound (B) in the liquid hair dye composition of the present invention is, from the viewpoint of dissolving the component (A) stably, improving the storage stability and imparting good hair dyeability and from the viewpoint of keeping a preparation in a liquid state, preferably 3 mass % or more, more preferably 4 mass % or more, further preferably 5 mass % or more, and further preferably 7 mass % or more; and preferably 20 mass % or less, more preferably 18 mass % or less, further preferably 15 mass % or less, and further preferably 13 mass % or less.

The mass ratio of the compound (A) to the compound (B), [(A)/(B)], in the liquid hair dye composition of the present invention is, from the viewpoint of dissolving the compound (A) stably and improving the storage stability and the viewpoint of feeding the compound (A) into hair effectively and imparting good hair dyeability, preferably 0.1 or more, more preferably 0.5 or more, further preferably 1 or more, and further preferably 2 or more; and preferably 20 or less, more preferably 15 or less, further preferably 10 or less and further preferably 8 or less.

[Component (C): Water]

The liquid hair dye composition of the present invention contains water being a medium as component (C). From the viewpoint of improving the solubility of the component (A) and the storage stability, the viewpoint of obtaining an effect in which the hue or color tone of hair appearance is varied in accordance with the angle for viewing the hair, and the viewpoint of facilitating the color toning with the prediction of a hair color after hair dyeing, the content of the component (C) in the liquid hair dye composition of the present invention is preferably over 2 mass %, more preferably 10 mass % or more, and further preferably 39 mass % or more; and preferably 95.5 mass % or less, more preferably 95 mass % or less, and further preferably 90 mass % or less.

From the viewpoint of dissolving the component (A) stably and improving the storage stability and the viewpoint of keeping the composition in a liquid state, the mass ratio of the component (B) to the component (C), [(B)/(C)], in the liquid hair dye composition of the present invention is preferably 0.02 or more, more preferably 0.05 or more, and further preferably 0.08 or more; and preferably 1.0 or less, more preferably 0.5 or less, and further preferably 0.2 or less.

[Component (D): Alkali Agent]

The liquid hair dye composition of the present invention preferably further contains an alkali agent as a component (D) to achieve both good storage stability and good hair dyeability. Examples of the alkali agent include; ammonia and salts thereof; alkanolamines such as monoethanolamine, isopropanolamine, 2-amino-2-methylpropanol, 2-aminobutanol, diethanolamine, triethanolamine, monoethanol methylamine, monoethanol dimethylamine, diethanol methylamine, monoethanol ethylamine, monoethanol diethylamine, diethanol ethylamine, monoethanol propylamine, monoethanol dipropylamine, diethanol propylamine, monoethanol butylamine, and diethanol butylamine, and salts thereof; alkali metal hydroxides such as sodium hydroxide and potassium hydroxide; alkanediamines such as 1,3-propane diamine, and salts thereof; carbonates such as sodium carbonate, potassium carbonate and guanidine carbonate; and hydrogen carbonates such as sodium hydrogen carbonate and potassium hydrogen carbonate. In particular, from the viewpoint of achieving good storage stability and good hair dyeability, preferred are alkanolamines and salts thereof; more preferred are ammonia, monoethanolamine, isopropanolamine, and 2-amino-2-methylpropanol; particularly, preferred is 2-amino-2-methylpropanol. These components (D) may be used alone or in combination of two or more.

The content of the component (D) in the liquid hair dye composition of the present invention is, from the viewpoint of obtaining good storage stability, preferably 0.1 mass % or more, more preferably 0.2 mass % or more, further preferably 0.25 mass % or more, and further preferably 0.5 mass % or more; and from the viewpoint of inhibiting skin stimulation, preferably 15 mass % or less, more preferably 12.5 mass % or less, further preferably 10 mass % or less, and further preferably 9.0 mass % or less.

[Component (E): Monoalcohol or Diol]

The liquid hair dye composition of the present invention may contain, from the viewpoint of improving the storage stability, a monoalcohol or diol as a component (E).

Examples of the monoalcohol include a lower alkanol, an aromatic alcohol, and an alkoxyalcohol, and examples of the diol include an alkylene glycol, a dialkylene glycol, and polyethylene glycol. More specifically, as the monoalcohol, preferred are lower monoalcohols having from 2 or 3 carbon atoms such as ethanol, 1-propanol and 2-propanol; monocyclic aromatic monoalcohols such as benzyl alcohol and 2-benzyloxyethanol; and alkoxy alcohols such as ethoxyethanol, ethoxy diglycol, and methoxyethanol. As the diol, preferred are diols having from 2 to 6 carbon atoms such as propylene glycol, 1,3-butanediol and diethylene glycol. The component (E) preferably includes, from the viewpoint of improving the storage stability of the component (A) and the level dyeability, one or more selected from the group consisting of lower monoalcohols having 2 or 3 carbon atoms, monocyclic aromatic monoalcohols and diols having from 2 to 6 carbon atoms; more preferably one or more selected from the group consisting of lower monoalcohols having 2 or 3 carbon atoms and diols having from 2 to 6 carbon atoms; further preferably one or more selected from the group consisting of ethanol, 1-propanol, 2-propanol, propylene glycol, 1,3-butanediol and diethylene glycol; and further preferably one or more selected from the group consisting of 2-propanol and propylene glycol.

The content of the component (E) in the liquid hair dye composition of the present invention is, from the viewpoint of obtaining an effect in which the hue or color tone of hair appearance is varied in accordance with the angle for viewing the hair and the viewpoint of facilitating the color toning with the prediction of a hair color after hair dyeing, preferably 70 mass % or less, more preferably 40 mass % or less, further preferably 20 mass % or less, further preferably 10 mass % or less, and further preferably 5 mass % or less; and preferably 0.1 mass % or more.

[Direct Dye Other than the Component (A)]

A direct dye other than the component (A) can be also used in combination in the liquid hair dye composition of the present invention to adjust a hair dyeing color. However, from the viewpoint of exerting no impact on the hair dyeability of the component (A), the content of the component (A) is preferably 1 mass % or more and 100 mass % or less, more preferably 5 mass % or more and 100 mass % or less, further preferably 10 mass % or more and 100 mass % or less, further preferably 20 mass % or more and 100 mass % or less, further preferably 50 mass % or more and 100 mass % or less, and further preferably 80 mass % or more and 100 mass % or less in the entirety of direct dyes.

Examples of the direct dyes other than the component (A) include anion dyes, cation dyes and neutral dyes. Examples of the anion dyes include Acid Black 1, Acid Blue 1, Acid Blue 3, Food Blue No. 2, Food Blue No. 5, Acid Blue 7, Acid Blue 9, Acid Blue 74, Acid Orange 3, Acid Orange 6, Acid Orange 7, Acid Orange 10, Acid Red 1, Acid Red 14, Acid Red 18, Acid Red 27, Acid Red 50, Acid Red 52, Acid Red 73, Acid Red 87, Acid Red 88, Acid Red 92, Acid Red 155, Acid Red 180, Acid Violet 9, Acid Violet 43, Acid Violet 49, Acid Yellow 1, Acid Yellow 23, Acid Yellow 3, Food Yellow No. 8, Acid Orange 24, Acid Green 25, Solvent Green 7, Solvent Red 73, Acid Red 95, Solvent Red 43, Solvent Red 48, Acid Red 33, Solvent Violet 13, Acid Yellow 73, Food Red No. 17, Food Red No. 1, Food Yellow No. 3, Food Blue No. 2, Food Black No. 1, Food Black No. 2, Disperse Black 9, Disperse Violet 1, and alkali metal salts thereof (sodium salt and potassium salt). Examples of the cation dyes include, Basic Blue 6, Basic Blue 7, Basic Blue 9, Basic Blue 26, Basic Blue 41, Basic Blue 99, Basic Brown 4, Basic Brown 16, Basic Brown 17, Natural Brown 7, Basic Green 1, Basic Red 2, Basic Red 12, Basic Red 22, Basic Red 76, Basic Violet 1, Basic Violet 2, Basic Violet 3, Basic Violet 10, Basic Violet 14, Basic Yellow 57, Basic Red 51, Basic Yellow 87, Basic Blue 17, and Basic Orange 31. Examples of the neutral dyes including nitro dyes include, HC Blue 2, HC Blue 4, HC Blue 5, HC Blue 6, HC Blue 7, HC Blue 8, HC Blue 9, HC Blue 10, HC Blue 11, HC Blue 12, HC Blue 13, HC Brown 1, HC Brown 2, HC Green 1, HC Orange 1, HC Orange 2, HC Orange 3, HC Orange 5, HC Red BN, HC Red 1, HC Red 3, HC Red 7, HC Red 8, HC Red 9, HC Red 10, HC Red 11, HC Red 13, HC Red 54, HC Red 14, HC Violet BS, HC Violet 1, HC Violet 2, HC Yellow 2, HC Yellow 4, HC Yellow 5, HC Yellow 6, HC Yellow 7, HC Yellow 8, HC Yellow 9, HC Yellow 10, HC Yellow 11, HC Yellow 12, HC Yellow 13, HC Yellow 14, HC Yellow 15, 2-amino-6-chloro-4-nitrophenol, picramic acid, 1,2-diamino-4-nitrobenzene, 1,4-diamino-2-nitrobenzene, 3-nitro-4-aminophenol, 1-hydroxy-2-amino-3-nitrobenzene, 2-hydroxyethylpicramic acid, 3-nitro-p-hydroxyethylaminophenol, 4-hydroxypropylamino-3-nitrophenol, and N,N-bis(2-hydroxyethyl)-2'-nitro-p-phenylenediamine.

[Other Solvents and Surfactants]

With the purpose of the viscosity adjustment and the feel adjustment of a preparation, the liquid hair dye composition of the present invention may further contain a solvent other than the components (C) and (E). Examples of the solvent other than the components (C) and (E) include tri- or higher-valent polyols such as glycerin; N-alkylpyrrolidones such as N-methylpyrrolidone and N-ethylpyrrolidone; alkylene carbonates such as propylene carbonate; and lactones such as γ-valerolactone and γ-caprolactone. When the liquid hair dye composition contains a solvent other than the components (C) and (E), the solvent is present in an amount of preferably from 0 to 30 mass %, more preferably from 0 to 20 mass %, and further preferably from 0 to 10 mass %; and the rest is preferably balanced by water, the component (C), from the viewpoint of maintaining the level dyeability, feeding the component (A) into hair effectively and imparting good hair dyeability.

From the viewpoint of keeping good solubility of the component (A), it is preferred that the liquid hair dye composition of the present invention contain substantially no cationic surfactant; and the content of the cationic surfactant in the liquid hair dye composition is preferably 3 mass % or less, more preferably 1 mass % or less, further preferably 0.5 mass % or less, further preferably 0.1 mass % or less, and further preferably 0.001 mass % or less.

[Conditioning Component]

The liquid hair dye composition of the present invention may contain a conditioning component which is suitable for application to hair. Examples of the conditioning component include cationic polymers, silicones, higher alcohols and organic conditioning oils.

[pH]

From the viewpoint of an improvement in hair dyeability, the pH of the liquid hair dye composition of the present invention is preferably 7.5 or more, more preferably 8.0 or more, further preferably 8.5 or more, and further preferably 9.0 or more; and from the viewpoint of reducing skin stimulation, it is preferably 12.0 or less, more preferably 11.5 or less, and further preferably 11.0 or less. In the present invention, the pH of the liquid hair dye composition refers to a value at 25° C. when the composition is diluted 10 times by mass with water using a pH meter (F-51 manufactured by Horiba, Ltd.).

Examples of pH adjustors to adjust the composition to the above pH may include inorganic acids such as hydrochloric acid and phosphoric acid; organic acids such as citric acid, glycolic acid and lactic acid; hydrochlorides such as ammonium chloride and monoethanolamine hydrochloride; and phosphates such as potassium dihydrogen phosphate and disodium hydrogen phosphate.

[Other Optional Components]

Other components, which are commonly used as cosmetic materials, can be further added to the liquid hair dye composition of the present invention, as long as a stable form of liquid and a function of a hair dye agent are not impaired. Examples of such optional components can include a penetration enhancer, a pearly pigment, an antiseptic agent, a sequestering agent, a stabilizing agent, an antioxidant, an ultraviolet absorbing agent, a moisturizing agent, and an odor-control agent; and specific examples of optional components include a hydrolyzed protein, a protein derivative, an amino acid, a botanical extract, a vitamin, and a perfume.

[Method for Use]

The liquid hair dye composition of the present invention can be used alone as a hair dye composition. In addition, since the liquid hair dye composition contains the component (A) of a direct dye at a high concentration, a hair color of dyed hair is easily predicted even in the case of color toning by mixing; and after the composition is mixed with an additional preparation before use, the mixture can be applied to hair and used for hair dyeing. Here, examples of "additional preparation" include a shampoo, a conditioner and a hair dye composition in addition to a diluent liquid such as water and an alkali agent-containing aqueous solution. From the viewpoint of imparting a good mixing property with the liquid hair dye composition of the present invention, the form of the additional preparation is preferably liquid. Examples of the hair dye composition include a one-part hair dye composition containing a direct dye, and a two-part hair dye composition consisting of a first part containing an alkali agent and an oxidation dye precursor and a second part containing an oxidizing agent.

In particular, in the case that the liquid hair dye composition of the present invention is mixed and used with the first part and second part of the two-part hair dye composition, when this liquid mixture is applied to hair, the central portion of a section of hair is dyed with an oxidation dye and the peripheral portion of the section of hair is dyed with the component (A), and consequently the hair can be dyed in two layers of hues. Such hair dyed in two layers of hues can provide an unprecedented hair dyeing effect in which the hue or color tone of hair appearance is varied in accordance with the angle for viewing the hair.

As a method for dyeing hair by mixing the liquid hair dye composition of the present invention with first part and second part of a two-part hair dye composition, exemplified is a hair dyeing method having the following steps (I) and (II):

Step (I): mixing the first part containing an alkali agent and an oxidation dye precursor, the second part containing an oxidizing agent, and the liquid hair dye composition of the present invention as a third part with one another;

Step (II): applying the liquid mixture prepared in step (I) to hair.

[Step (I)]

The step (I) of the present invention is a step of mixing the first part containing the alkali agent and the oxidation dye precursor, the second part containing the oxidizing agent, and the third part of the liquid hair dye composition of the present invention. The alkali agent and the oxidation dye precursor used for the first part, and the oxidizing agent used for the second part are not particularly limited, and those commonly used for a two-part oxidative hair dye can be adopted.

The content of the alkali agent in the liquid mixture prepared in step (I) is, from the viewpoint of sufficiently swelling hair to obtain a hair dyeing effect, preferably 0.05 mass % or more, more preferably 0.1 mass % or more, further preferably 0.2 mass % or more, and further preferably 0.4 mass % or more; and preferably 7 mass % or less, more preferably 6 mass % or less, and further preferably 4 mass % or less.

As the oxidization dye precursor used for a two-part hair dye composition, any precursor can be used with no limitation as long as it is commonly used for a hair dye composition.

Examples of the oxidization dye precursor include: 1,2, 4-trihydroxybenzene, 1,3-bis(2,4-diaminophenoxy)-propane, 1,5-naphthalene diol, 1-naphthol, 1-hydroxyethyl-4,5-diaminopyrazole, 1-hexyl-1H-pyrazole-4,5-diaminopyrazole, 2,2'-[(4-aminophenyl)imino]bisethanol, 2,2'-methylenebis-4-aminophenol, indoline-2,3-dione, 2,4, 5,6-tetraamino pyrimidine, 2,4-diaminophenol, 2,4-diaminophenoxyethanol, 2,5,6-triamino-4-pyrimidinol, 2,6-diaminopyridine, 2,6-dihydroxy-3,4-dimethylpyridine, 2,6-dihydroxyethylaminotoluene, 2,6-dimethoxy-3,5-pyridine diamine, 2,7-naphthalenediol, 2-amino-3-hydroxypyridine, 2-amino-4-hydroxyethyl amino anisole, 2-amino-5-ethylphenol, 2-chloro-p-phenylenediamine, 2-methyl-1-naphthol, 2-methyl-5-hydroxyethylaminophenol, 2 methylresorcinol, 2-methoxy-methyl-p-phenylene diamine, 3,3'-diimino diphenol, 3-amino-2,6-dimethylphenol, 4-amino-2-hydroxytoluene, 4-amino-m-cresol, 4-chlororesorcinol, 4-formyl-1-methylquinolinium-p-toluenesulfonic acid, 5-(2-hydroxyethylamino)-2-methylphenol, 5-amino-4-chloro-o-cresol, 5-amino-6-chloro-o-cresol, 6-amino-m-cresol, 6-hydroxyindol, 6-methoxy-2-methylamino-3-aminopyridine, m-aminophenol, N,N-bis(2-hydroxyethyl)-p-phenylenediamine, N,N'-bis(4-aminophenyl)-2,5-diamino-1,4-quinonedimine, N-phenyl-p-phenylenediamine, p-aminophenol, p-phenylenediamine, p-methylaminophenol, acetoxy-2-methoxynaphthalene, ortho-aminophenol, catechol, dihydroxyindoline, diphenylamine, tannic acid, toluene-2,5-diamine, toluene-3,4-diamine, hydroxyethyl-3, 4-methylenedioxyaniline, hydroxyethyl-p-phenylenediamine, hydroxyethylamino pyrazolopyridine, hydroxypropyl bis(N-hydroxyethyl-p-phenylenediamine), hydroxybenzomorpholine, hydroquinone, pyrogallol, phenylmethyl pyrazolone, phloroglucin, meta-phenylenediamine, methylimidazolium propyl p-phenylenediamine, resorcinol, gallic acid and others; and salts thereof.

The content of the oxidation dye precursor in the liquid mixture is, from the viewpoint of obtaining a sufficient hair dyeability, preferably 0.001 mass % or more, more preferably 0.002 mass % or more, further preferably 0.004 mass % or more, and further preferably 0.01 mass % or more; and preferably 8 mass % or less, more preferably 6 mass % or less, further preferably 4 mass % or less, and further preferably 2 mass % or less.

The content of the oxidizing agent in the liquid mixture is, from the viewpoint of the hair bleachability and the hair dyeability, preferably 0.06 mass % or more, more preferably 0.1 mass % or more, further preferably 0.2 mass % or more, further preferably 0.5 mass % or more, and further preferably 1 mass % or more; and preferably 17 mass % or less, more preferably 12.5 mass % or less, further preferably 11 mass % or less, and further preferably 9 mass % or less.

From the viewpoint of obtaining a hair dyeing effect in which hair is dyed in two layers of hue and the hue or color tone of hair appearance is varied in accordance with the angle for viewing the hair and the viewpoint of facilitating the color toning with the prediction of a hair color after hair dyeing, the content of the dye (A) in the liquid mixture is preferably 0.02 mass % or more, more preferably 0.05 mass % or more, further preferably 0.08 mass % or more, and further preferably 0.10 mass % or more; and from the viewpoint of obtaining uniform dyeing by dissolution in the liquid mixture, preferably 5 mass % or less, more preferably 2 mass % or less, further preferably 1.0 mass % or less, and further preferably 0.5 mass % or less.

From the viewpoint of keeping the solubility of the component (A) in a good condition, it is preferred that the liquid mixture of the liquid hair dye composition of the present invention and the two-part hair dye composition should not substantially contain a cationic surfactant; and the content of the cationic surfactant in the liquid hair dye composition is preferably 3 mass % or less, more preferably 1 mass % or less, further preferably 0.5 mass % or less, further preferably 0.1 mass % or less, and further preferably 0.001 mass % or less.

In the step (I), from the viewpoint of dyeing hair in two layers and changing the hue or color tone of hair appearance depending on the angle for viewing the hair, and the viewpoint of facilitating the color toning with the prediction of a hair color after hair dyeing, the mass ratio of the dye (A) and the oxidation dye precursor in the liquid mixture, [(dye (A))/(oxidation dye precursor)], is preferably 0.005 or more, more preferably 0.015 or more, further preferably 0.03 or more, further preferably 0.1 or more, further preferably 0.2 or more, and further preferably 0.3 or more; and preferably 5,000 or less, more preferably 500 or less, further preferably 100 or less, further preferably 50 or less, further preferably 10 or less, and further preferably 8 or less.

[Mixing Ratio]

From the viewpoint of obtaining a sufficient hair dyeability, the mixing mass ratio of the first part and the second part, [(second part)/(first part)], is preferably 0.2 or more, more preferably 0.3 or more, and further preferably 0.5 or more; and preferably 5 or less, more preferably 3 or less, and further preferably 2 or less. In addition, from the viewpoint of dyeing hair in two layers and enhancing a dyeing effect in which the hue or color tone of hair appearance is varied in accordance with the angle for viewing the hair, and the viewpoint of facilitating the color toning with the prediction of a hair color after hair dyeing, the mass ratio of the third part with respect to the total mass of the first part and the second part, [(third part)/((first part)+(second part))], is preferably 0.01 or more, more preferably 0.02 or more, and further preferably 0.03 or more; and preferably 0.4 or less, more preferably 0.3 or less, and further preferably 0.2 or less.

[Step (II)]

The step (II) is a step of applying the liquid mixture prepared in the step (I) on hair. When the liquid mixture is applied to hair, a bath ratio, that is, a ratio of the mass of the applied liquid mixture with respect to the mass of hair, [(mass of the applied liquid mixture)/(mass of hair)], and a standing time and a standing temperature from application of the liquid mixture to hair to washing of the hair have a great influence on finishing.

The bath ratio, [(mass of the applied liquid mixture)/(mass of hair)] is, from the viewpoint of improving the hair dyeability and preventing color unevenness, preferably 0.1 or more, more preferably 0.2 or more, and further preferably 0.4 or more; and from the viewpoint of economic efficiency and reduction of a risk of dripping, preferably 2 or less, more preferably 1.75 or less and further preferably 1.5 or less.

The standing time from application of the liquid mixture to hair to washing of the hair is, from the viewpoint of improving the hair dyeability, preferably 1 minute or more, more preferably 5 minutes or more, and further preferably 10 minutes or more; and from the viewpoint of inhibiting skin stimulation, preferably 60 minutes or less, more preferably 45 minutes or less, and further preferably 40 minutes or less.

From the viewpoint of improving the hair dyeability, the temperature at which hair is allowed to stand after the liquid mixture is applied to the hair is preferably 5° C. or more, more preferably 10° C. or more, and further preferably 20° C. or more; and from the viewpoint of inhibiting skin stimulation, preferably 60° C. or less, more preferably 50° C. or less, and further preferably 40° C. or less.

[Step (III)]

After the step (II), the hair may be rinsed and/or washed. For rinsing, any aqueous medium that is known in the art, preferably water, more preferably tap water may be used; and for washing, any cleaning agent composition that is known in the art, preferably a shampoo composition may be used. A root portion, a distal end portion and a portion therebetween of hair may be rinsed and washed simultaneously or separately.

[Step (IV)]

After or before the step (III), or instead of step (III), any conditioning composition that is already known in the art may be applied to hair.

[Step (V)]

After the step (II), (III) or (IV), hair may be dried. For drying hair, a drying tool, for example, towel or an electric drying tool such as a hair dryer may be used, and drying may be performed partially or completely.

For the embodiments described above, preferred embodiments of the present invention are further disclosed hereafter.

<1> A liquid hair dye composition comprising the following components (A), (B) and (C):

(A) one or more azo dyes selected from the group consisting of the following formulae (A-1), (A-2) and (A-3):

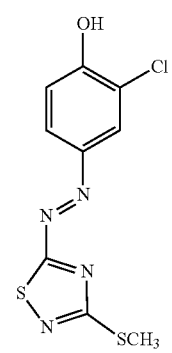

(A-1)

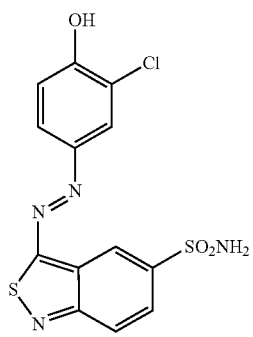
(A-2)

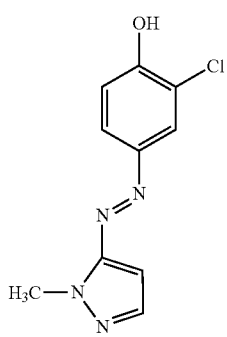
(A-3)

(B) one or more surfactants with an HLB of 7 or more, selected from the group consisting of anionic surfactants, nonionic surfactants and amphoteric surfactants; and (C) water, wherein a content of the component (A) is 1.5 mass % or more.

<2> A liquid hair dye composition comprising the following components (A), (B) and (C):

(A) one or more azo dyes selected from the group consisting of the following formulae (A-1), (A-2) and (A-3):

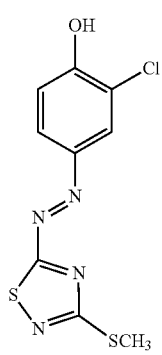
(A-1)

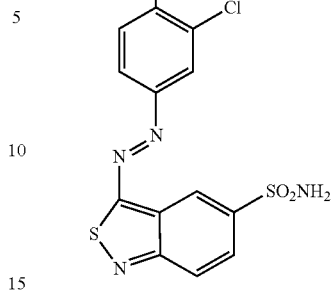
(A-2)

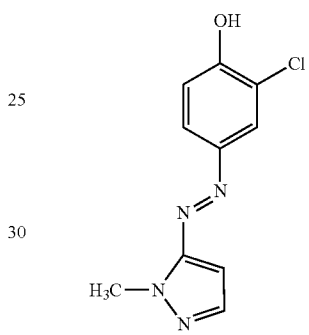
(A-3)

(B) one or more surfactants with an HLB of 7 or more and 50 or less, selected from the group consisting of anionic surfactants, nonionic surfactants and amphoteric surfactants; and (C) water, wherein a content of the component (A) is 1.5 mass % or more and 5.5 mass % or less.

<3> A liquid comprising the following components (A), (B) and (C):

(A) one or more azo dyes selected from the group consisting of the following formulae (A-1), (A-2) and (A-3):

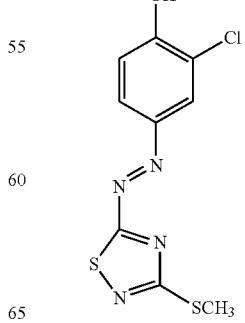
(A-1)

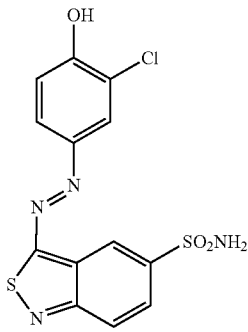

(A-2)

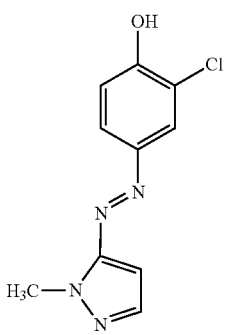

(A-3)

(B) one or more surfactants with an HLB of 7 or more and 40 or less, selected from the group consisting of anionic surfactants, nonionic surfactants and amphoteric surfactants; and (C) water, wherein a content of the component (A) is 1.5 mass % or more and 5.5 mass % or less.

<4> The liquid hair dye composition according to any one of <1> to <3>, wherein the component (B) is one or more selected from the group consisting of anionic surfactants and nonionic surfactants.

<5> The liquid hair dye composition according to any one of <1> to <4>, wherein the component (B) is one or more selected from the group consisting of alkyl or alkenyl sulfates, alkyl or alkenyl ether sulfates, alkyl or alkenyl ether carboxylates and N-acyl amino acid salts.

<6> The liquid hair dye composition according to any one of <1> to <4>, wherein the component (B) is one or more selected from the group consisting of alkyl or alkenyl ether sulfates and N-acyl amino acid salts.

<7> The liquid hair dye composition according to any one of <1> to <4>, wherein the component (B) is one or more selected from N-acyl amino acid salts.

<8> The liquid hair dye composition according to any one of <1> to <4>, wherein the component (B) comprises a polyoxyethylene alkyl or an alkenyl ether.

<9> The liquid hair dye composition according to any one of <1> to <4>, wherein the component (B) is a fatty acid amido alkyl betaine having a fatty acid group with from 10 to 14 carbon atoms and having an alkyl group with from 2 to 4 carbon atoms.

<10> The liquid hair dye composition according to any one of <1> to <4>, wherein the component (B) is one or more selected from alkyl or alkenyl ether sulfates having a linear alkyl or alkenyl group with from 12 to 14 carbon atoms and having a polyoxyethylene with an average number of added moles of from 0.5 to 4.

<11> The liquid hair dye composition according to any one of <1> to <4>, wherein the component (B) is one or more selected from the group consisting of polyoxyethylene (1) lauryl ether sulfates, polyoxyethylene (1) myristyl ether sulfates, polyoxyethylene (2) lauryl ether sulfates, polyoxyethylene (2) myristyl ether sulfates, polyoxyethylene (3) lauryl ether sulfates and polyoxyethylene (3) myristyl ether sulfates.

<12> The liquid hair dye composition according to any one of <1> to <4>, wherein the component (B) is one or more selected from N-acyl amino acid salts, wherein an acyl group is derived from a fatty acid having a saturated or unsaturated linear or branched chain having from 10 to 18 carbon atoms, an amino acid moiety is one selected from the group consisting of glutamic acid and aspartic acid and the amino acid moiety has an L-form.

<13> The liquid hair dye composition according to any one of <1> to <4>, wherein the component (B) is one or more selected from the group consisting of N-lauroyl glutamates, N-myristoyl glutamates and N-cocoyl glutamates.

<14> The liquid hair dye composition according to any one of <1> to <4>, wherein the component (B) is a polyoxyethylene alkyl or alkenyl ether having an alkyl or alkenyl group with from 12 to 20 carbon atoms, and having a polyoxyethylene with an average number of added moles of from 20 to 60.

<15> The liquid hair dye composition according to any one of <1> to <4>, wherein the component (B) is one or more selected from the group consisting of Laureth-23, Ceteth-25, Isoceteth-20, Ceteth-40, Octyldodeceth-25 and Oleth-50.

<16> The liquid hair dye composition according to any one of <1> to <4>, wherein the component (B) is one or more selected from the group consisting of lauramidopropyl betaine, polyoxyethylene (2) laurylether sulfate, sodium cocoyl glutamate, Isoceteth-20, Octyldodeceth-25 and Oleth-50.

<17> The liquid hair dye composition according to any one of <1> to <16>, wherein a content of the component (B) in the liquid hair dye composition is 3 mass % or more and 20 mass % or less.

<18> The liquid hair dye composition according to any one of <1> to <16>, wherein a content of the component (B) in the liquid hair dye composition is 4 mass % or more and 18 mass % or less.

<19> The liquid hair dye composition according to any one of <1> to <16>, wherein a content of the composition (B) in the liquid hair dye composition is 5 mass % or more and 15 mass % or less.

<20> The liquid hair dye composition according to any one of <1> to <16>, wherein a content of the component (B) is 7 mass % or more and 13 mass % or less.

<21> The liquid hair dye composition according to any one of <1> to <20>, wherein a mass ratio of the component (A) to the component (B), [(A)/(B)], in the liquid hair dye composition is 0.1 or more and 20 or less.

<22> The liquid hair dye composition according to any one of <1> to <20>, wherein a mass ratio of the component (A) to the component (B), [(A)/(B)], in the liquid hair dye composition is 0.5 or more and 15 or less.

<23> The liquid hair dye composition according to any one of <1> to <20>, wherein a mass ratio of the component (A) to the component (B), [(A)/(B)], in the liquid hair dye composition is 1 or more and 10 or less.

<24> The liquid hair dye composition according to any one of <1> to <20>, wherein a mass ratio of the component (A) to the component (B), [(A)/(B)], in the liquid hair dye composition is 2 or more and 8 or less.

<25> The liquid hair dye composition according to any one of <1> to <24>, wherein a content of the component (C) in the liquid hair dye composition is over 2 mass % and 95.5 mass % or less.

<26> The liquid hair dye composition according to any one of <1> to <24>, wherein a content of the component (C) in the liquid hair dye composition is 10 mass % or more and 95 mass % or less.

<27> The liquid hair dye composition according to any one of <1> to <24>, wherein a content of the component (C) in the liquid hair dye composition is 39 mass % or more and 90 mass % or less.

<28> The liquid hair dye composition according to any one of <1> to <27>, wherein a mass ratio of the component (B) to the component (C), [(B)/(C)], in the liquid hair dye composition is 0.02 or more and 1.0 or less.

<29> The liquid hair dye composition according to any one of <1> to <27>, wherein a mass ratio of the component (B) to the component (C), [(B)/(C)], in the liquid hair dye composition is 0.05 or more and 0.5 or less.

<30> The liquid hair dye composition according to any one of <1> to <27>, wherein a mass ratio of the component (B) to the component (C), [(B)/(C)], in the liquid hair dye composition is 0.08 or more and 0.2 or less.

<31> The liquid hair dye composition according to any one of <1> to <30>, further comprising an alkali agent as a component (D).

<32> The liquid hair dye composition according to <31>, wherein the component (D) is one or more selected from the group consisting of ammonia, monoethanolamine, isopropanolamine and 2-amino-2-methylpropanol.

<33> The liquid hair dye composition according to <31>, wherein the component (D) is one or more selected from the group consisting of ammonia and 2-amino-2-methylpropanol.

<34> The liquid hair dye composition according to any one of <31> to <33>, wherein a content of the component (D) in the liquid hair dye composition is 0.1 mass % or more and 15 mass % or less.

<35> The liquid hair dye composition according to any one of <31> to <33>, wherein a content of the component (D) in the liquid hair dye composition is 0.2 mass % or more and 12.5 mass % or less.

<36> The liquid hair dye composition according to any one of <31> to <33>, wherein a content of the component (D) in the liquid hair dye composition is 0.25 mass % or more and 10 mass % or less.

<37> The liquid hair dye composition according to any one of <31> to <33>, wherein a content of the component (D) in the liquid hair dye composition is 0.5 mass % or more and 9.0 mass % or less.

<38> The liquid hair dye composition according to any one of <1> to <37>, further comprising the following component (E) in an amount of 70 mass % or less,
  (E) one or more selected from the group consisting of monoalcohols and diols.

<39> The liquid hair dye composition according to <38>, wherein a content of the component (E) in the liquid hair dye composition is 0.1 mass % or more and 40 mass % or less.

<40> The liquid hair dye composition according to <38>, wherein a content of the component (E) in the liquid hair dye composition is 0.1 mass % or more and 20 mass % or less.

<41> The liquid hair dye composition according to <38>, wherein a content of the component (E) in the liquid hair dye composition is 0.1 mass % or more and 10 mass % or less.

<42> The liquid hair dye composition according to <38>, wherein a content of the component (E) in the liquid hair dye composition is 0.1 mass % or more and 5 mass % or less.

<43> The liquid hair dye composition according to any one of <1> to <42>, wherein the composition is used after a hair dyeing color is adjusted by mixing with additional preparation.

<44> The liquid hair dye composition according to <43>, wherein the additional preparation is one selected from the group consisting of a shampoo, a conditioner and a hair dye composition.

<45> The liquid hair dye composition according to <43>, wherein the additional preparation is a two-part hair dye composition consisting of a first part containing an alkali agent and an oxidation dye precursor and a second part containing an oxidizing agent.

<46> The liquid hair dye composition according to <45>, wherein the composition is mixed at a ratio of 0.01 or more and 0.4 or less with respect to a liquid mixture of the first part and the second part of the two-part hair dye composition.

<47> A method for use of the liquid hair dye composition according to any one of <1> to <42>, wherein the liquid hair dye composition is mixed with an additional preparation to adjust a hair dyeing color, and then used for hair dyeing.

<48> The method for use of the liquid hair dye composition according to <47>, wherein the additional preparation is one selected from the group consisting of a shampoo, a conditioner and a hair dye composition, preferably a hair dye composition.

<49> The method for use of the liquid hair dye composition according to <47>, wherein the additional preparation is a two-part hair dye composition consisting of a first part containing an alkali agent and an oxidation dye precursor and a second part containing an oxidizing agent.

<50> The method for use of the liquid hair dye composition according to <49>, wherein the composition is mixed at a ratio of 0.01 or more and 0.4 or less with respect to a liquid mixture of the first part and the second part of the two-part hair dye composition.

Example 1

Examples 1 to 12 and Comparative Examples 1 to 8

Liquid hair dye compositions were prepared by mixing components shown in Tables 1 and 2, and evaluations were made on the solubility and the storage stability of dyes, and the hair dyeing effect when the composition is mixed with a two-part hair dye composition and used for hair dyeing, evaluations in accordance with the methods described below.

[Method for Evaluating the Solubility of Dyes]

Surfactant solutions were prepared by uniformly dissolving components shown in Tables 1 and 2 except dyes, and then, a dye was added and a mixture was stirred for 20 minutes or more, so that a liquid hair dye composition was prepared. Liquid hair dye compositions were visually observed, and evaluated on the solubility based on the following criteria. Note that when an example was evaluated as "d", it was not evaluated for other items.

A: uniformly mixed and no insoluble matters were observed
  d: not uniformly mixed and insoluble matters were observed

[Storage Stability]

In the method for evaluating the solubility of dyes, each of liquid hair dye compositions evaluated as "A" in the evaluation on the solubility immediately after preparation was stored at different temperatures of −5° C., 5° C., 20° C. and 40° C. for 1 week, and then, the solubility was visually observed and evaluated based on the following criteria.

A: no insoluble matters were observed d: insoluble matters were observed

In addition, first part and second part of an oxidative hair dye having compositions shown Table 3 were prepared; these oxidative hair dyes and each liquid hair dye composition shown in Tables 1 and 2 were used to dye hair according to the following hair dyeing method; and evaluations were made on a color different from the case where hair was dyed by an oxidative hair dye alone and an effect of changing the hue or color tone of hair appearance in accordance with the angle for viewing the hair.

<Hair Dyeing Method>

A hair tress with a length of 15 cm and a weight of about 1 g was created using white hair (Natural White manufactured by IHIP), and used for evaluation.

In a plastic beaker, 4 g of the first part, 6 g of the second part and 1.25 g of a liquid hair dye composition were mixed ten times with a spatula. About 1 g of this liquid mixture was applied to hair for evaluation with a brush, and the hair was left to stand at 30° C. for 30 minutes to dye the hair. The hair was rinsed with warm water (40° C.) for 30 seconds or more, washed with a shampoo, treated with a conditioner and then dried.

[Method for Evaluating Changes in the Hue or Color Tone of Hair Appearance in Accordance with the Angle for Viewing the Hair]

Dried hair after hair dyeing was observed as a hair tress at a distance of about 30 cm under an artificial solar lighting manufactured by Seric Ltd. (model XC-100AP, 100W). A panelist fixed one end of the hair tress for evaluation and moved the other end thereof to change angles for viewing the hair, and changes of hair color in that case were observed.

The degree of color changes was evaluated by 5 panelists using a non-restrictive close-ended system of a direct evaluation method. That is, a 10 cm-long straight line was drawn horizontally; a left end of the straight line was defined as a case of evaluation wherein "no color changes were observed even when angels were changed" and a right end thereof was defined as a case of evaluation wherein "a completely different color was observed in accordance with the angle"; and for evaluation of hair treated with each of Examples and Comparative Examples, a line was drawn between the left and right ends as an answer for evaluation. Then, a distance from the left end to a position of the drawn line was checked on the straight line, and the degree of changes in the hue or color tone of hair appearance was represented thereby. An average of the 5 panelists is shown as a score in Tables 1 and 2. A higher score indicates a larger change in the hue or color tone of hair appearance in accordance with the angle for viewing the hair.

[Color Difference]

A color difference (ΔE) from the case where hair was dyed in the same manner except that an oxidative hair dye (4 g of the first part, 6 g of the second part, and 1.25 g of 1.12 mass % ammonia aqueous solution as the third part) was used, was measured by use of a color difference meter (CR-400 manufactured by Konica Minolta, Inc.).

TABLE 1

| | | Examples | | | | | | Comparative Examples | | | |
|---|---|---|---|---|---|---|---|---|---|---|---|
| | Component (mass %: active amount) | 1 | 2 | 3 | 4 | 5 | 6 | 1 | 2 | 3 | 4 |
| (B) | Lauramidopropyl betaine (HLB* >27.43)*1 | 10 | — | — | — | — | — | — | — | — | — |
| | Sodium laureth sulfate (HLB* = 40.66)*2 | — | 10 | — | — | — | — | — | — | — | — |
| | Sodium cocoyl glutamate (HLB* >20)*3 | — | — | 10 | — | — | — | — | — | — | — |
| | Laureth-23 (HLB* = 10.79)*4 | — | — | — | 10 | — | 10 | — | — | — | — |
| | Octyldodeceth-25 (HLB* = 7.65)*5 | — | — | — | — | 10 | — | — | — | — | — |
| (B)' | Ceteth-2 (HLB* = 1.96)*6 | — | — | — | — | — | — | 10 | — | — | — |
| | Steartrimonium chloride (HLB* = 6.43)*7 | — | — | — | — | — | — | — | 10 | — | — |
| (A) | HC Red 18 | 2 | 2 | 2 | 2 | 2 | 2 | 2 | 2 | 0.5 | 2 |
| (D) | Ammonia | 1.12 | 1.12 | 1.12 | 1.12 | 1.12 | 1.12 | 1.12 | 1.12 | 1.12 | 1.12 |
| (E) | Propylene glycol | — | — | — | — | — | 80 | — | — | — | — |
| (C) | Purified water | Balance | Balance | Balance | Balance | Balance | Balance | Balance | Balance | Balance | Balance |
| | Total | 100 | 100 | 100 | 100 | 100 | 100 | 100 | 100 | 100 | 100 |
| Solubility | Immediately after preparation | A | A | A | A | A | A | d | d | A | d |
| Storage stability | After one week at −5° C. | A | A | A | d | A | A | — | — | d | — |
| | After one week at 5° C. | A | A | A | d | A | A | — | — | d | — |
| | After one week at 20° C. | A | A | A | d | A | A | — | — | d | — |
| | After one week at 40° C. | A | A | A | A | A | A | — | — | d | — |
| Evaluation on hair dyeing | Improvement of changes in the hue or color tone of hair appearance in accordance with the angle for viewing the hair | 6.1 | 6.3 | 7.7 | 5.6 | 5.8 | 4.8 | — | — | 2.6 | — |
| | Color difference (ΔE) from hair dyeing by oxidation dye alone | 13.7 | 19.1 | 20.5 | 14.7 | 15.1 | 11.8 | — | — | 11.5 | — |

TABLE 2

| Component (mass %: active amount) | | Examples | | | Comparative Examples | | Examples | | | Comparative Examples | |
|---|---|---|---|---|---|---|---|---|---|---|---|
| | | 7 | 8 | 9 | 5 | 6 | 10 | 11 | 12 | 7 | 8 |
| (B) | Lauramidopropyl betaine (HLB* >27.43)*1 | 10 | — | — | — | — | 10 | — | — | — | — |
| | Sodium laureth sulfate (HLB* = 40.66)*2 | — | 10 | — | — | — | — | 10 | — | — | — |
| | Laureth-23 (HLB* = 10.79)*4 | — | — | 10 | — | — | — | — | 10 | — | — |
| (A) | HC Blue 18 | 1.5 | 1.5 | 1.5 | 0.3 | 1.5 | — | — | — | — | — |
| | HC Yellow 16 | — | — | — | — | — | 2 | 2 | 2 | 0.5 | 2 |
| (D) | Ammonia | 1.12 | 1.12 | 1.12 | 1.12 | 1.12 | 1.12 | 1.12 | 1.12 | 1.12 | 1.12 |
| (C) | Purified water | Balance | Balance | Balance | Balance | Balance | Balance | Balance | Balance | Balance | Balance |
| | Total | 100 | 100 | 100 | 100 | 100 | 100 | 100 | 100 | 100 | 100 |
| Solubility | Immediately after preparation | A | A | A | A | d | A | A | A | A | d |
| Storage stability | After one week at −5° C. | A | A | A | A | — | A | A | A | A | — |
| | After one week at 5° C. | A | A | A | A | — | A | A | A | A | — |
| | After one week at 20° C. | A | A | A | A | — | A | A | A | A | — |
| | After one week at 40° C. | A | A | A | A | — | A | A | d | A | — |
| Evaluation on hair dyeing | Improvement of changes in the hue or color tone of hair appearance in accordance with the angle for viewing the hair | 6.9 | 5.8 | 6.2 | 2.4 | — | 5.1 | 5.8 | 5.6 | 2.7 | — |
| | Color difference (ΔE) from hair dyeing by oxidation dye alone | 33.9 | 41.5 | 35.2 | 17.7 | — | 17.3 | 24.2 | 17.5 | 11.7 | — |

*1 AMPHITOL 20AB (manufactured by Kao Corporation)
*2 EMAL E-227 (manufactured by Kao Corporation)
*3 AMISOFT CS-22B (manufactured by Ajinomoto Co., Inc.)
*4 EMULGEN 123P (manufactured by Kao Corporation)
*5 EMULGEN 2025G (manufactured by Kao Corporation)
*6 BC-2 (manufactured by Nikko Chemicals Co., Ltd.)
*7 QUARTAMIN 86W (manufactured by Kao Corporation)

TABLE 3

| | | (mass %) |
|---|---|---|
| First part | Toluene-2,5-diamine | 0.38 |
| | 2,4-Diaminophenoxyethanol hydrochloride | 0.53 |
| | Ascorbic acid | 0.15 |
| | Sodium sulfite anhydride | 0.20 |
| | Ammonia | 1.68 |
| | EDTA-4Na | 0.05 |
| | Purified water | Balance |
| | First part in total | 100.00 |
| Second part | Hydrogen peroxide | 5.80 |
| | Purified water | Balance |
| | Second part in total | 100.00 |

Formulation Examples 1 to 16

First parts shown in Table 4 to 6, second parts shown in Tables 12 to 14 and a third part shown in Table 15 are prepared. In accordance with the combinations shown in Tables 16 to 19, first, second and third parts are mixed and used at a mixing ratio of 1:1:0.2.

TABLE 4

| First part formulation example I-A | (mass %) |
|---|---|
| Lauramide DEA*8 | 10.0 |
| Isostearyl glyceryl*9 | 10.0 |
| Butoxy ethanol | 9.0 |
| Octyldodeceth-20*10 | 7.0 |
| Ethanol | 6.0 |
| Oleyl alcohol | 5.0 |
| Propylene glycol | 4.0 |
| Oleic acid | 2.5 |
| Ammonia | 1.5 |
| Monoethanolamine | 2.7 |
| Stearamidoethyl diethylamine*11 | 2.5 |
| EDTA 4Na | 0.8 |
| Ammonium chloride | Amount for pH 9.8 |
| Sodium sulfite | 0.5 |
| Ascorbic acid | 0.5 |
| Oxidation dye (any one of formulation examples od-A to od-E) | Amount shown in each formulation example |
| Purified water | Balance |

*8 AMISOL LDE-G (manufactured by Kawaken Fine Chemicals Co., Ltd.)
*9 GE-IS (U) (manufactured by Kao Corporation)
*10 EMULGEN 2020G (manufactured by Kao Corporation)
*11 Ayacol AMINEAMIDE 50E (manufactured by Seiwa Kasei Co., Ltd.)

TABLE 5

| First part formulation example I-B | (mass %) |
|---|---|
| Cetearyl alcohol | 7.0 |
| Lanolin alcohol | 1.0 |
| Sodium laureth sulfate*2 | 2.8 |
| EDTA 4Na | 0.1 |
| Sodium sulfite | 0.4 |
| Ascorbic acid | 0.3 |
| Ammonia | 1.3 |
| Ammonium chloride | Amount for pH 9.8 |

TABLE 5-continued

| First part formulation example I-B | (mass %) |
|---|---|
| Oxidation dye (any one of formulation examples od-A to od-E) | Amount shown in each formulation example |
| Purified water | Balance |

*²EMAL E-227 (manufactured by Kao Corporation)

TABLE 6

| First part formulation example 1-C | (mass %) |
|---|---|
| Decyl glucoside*¹³ | 3.2 |
| Laureth-23*⁴ | 2.0 |
| Propylene glycol | 4.0 |
| Polyquaternium-7*¹⁴ | 0.4 |
| Ammonia | 2.4 |
| Ammonium hydrogen carbonate | 0.1 |
| Ammonium chloride | Amount for pH 9.8 |
| EDTA 4Na | 0.1 |
| Sodium sulfite | 0.4 |
| Ascorbic acid | 0.3 |
| Oxidation dye (any one of formulation examples od-A to od-E) | Amount shown in each formulation example |
| Purified water | Balance |

*¹³AG-10LK (manufactured by Kao Corporation)
*⁴EMULGEN 123P (manufactured by Kao Corporation)
*¹⁴Merquat 550 (manufactured by Lubrizol Japan Limited)

Oxidation dyes used for the above first part formulations are oxidation dye formulation examples od-A to od-E described below.

TABLE 7

| Oxidation dye formulation example od-A | (mass %) |
|---|---|
| N-phenyl-p-phenylenediamine | 0.08 |
| p-Phenylenediamine | 0.08 |
| Toluene-2,5-diamine | 0.08 |
| N,N-bis(2-hydroxyethyl)-p-phenylenediamine | 0.08 |
| 2,4,5,6-Tetraamino pyrimidine | 0.08 |
| Dihydroxyindoline | 0.08 |
| Dihydroxyethyl-p-phenylenediamine | 0.08 |
| 2.6-Dihydroxyethyl amino toluene | 0.1 |
| 1-Naphthol | 0.1 |
| Resorcinol | 0.1 |
| 4-Chlororesorcinol | 0.1 |
| 6-Methoxy-2-methylamino-3-aminopyridine | 0.1 |
| 5-Amino-4-chloro-o-cresol | 0.1 |
| Acetoxy-2-methoxynaphthalene | 0.1 |

TABLE 8

| Oxidation dye formulation example od-B | (mass %) |
|---|---|
| 6-Hydroxyindol | 0.08 |
| 2-Amino-3-hydroxypyridine | 0.08 |
| p-Methylaminophenol | 0.08 |
| 1,3-Bis(2,4-diaminophenoxy)-propane | 0.08 |
| Phenylmethyl pyrazolone | 0.08 |
| 2-Methyl-1-naphthol | 0.1 |
| 2,7-Naphthalene diol | 0.1 |
| m-Aminophenol | 0.1 |
| 2,6-Dihydroxy-3,4-dimethylpyridine | 0.1 |
| 2-Methyl-5-hydroxyethylaminophenol | 0.1 |
| Hydroxybenzomorpholine | 0.1 |
| 2,6-Dimethoxy-3,5-pyridine diamine | 0.1 |

TABLE 9

| Oxidation dye formulation example od-C | (mass %) |
|---|---|
| Hydroxypropyl bis(N-hydroxyethyl-p-phenylenediamine) | 0.08 |
| 2-Amino-5-ethylphenol | 0.08 |
| p-Aminophenol | 0.08 |
| 1-Hydroxyethyl-4,5-diaminopyrazole | 0.08 |
| 2,2'-Methylenebis-4-aminophenol | 0.08 |
| 1-Hexyl-1H-pyrazole-4,5-diamino pyrazole | 0.08 |
| 1,5-Naphthalene diol | 0.1 |
| 4-Amino-2-hydroxytoluene | 0.1 |
| 2,4-Diaminophenoxyethanol | 0.1 |
| 2-Methylresorcinol | 0.1 |
| 4-Amino-m-cresol | 0.1 |
| 2-Amino-4-hydroxyethyl amino anisole | 0.1 |
| Hydroxyethyl-3,4-methylenedioxyaniline | 0.1 |

TABLE 10

| Oxidation dye formulation example od-D | (mass %) |
|---|---|
| 2,5,6-Triamino-4-pyrimidinol | 0.08 |
| Hydroxyethylamino pyrazolopyridine | 0.08 |
| N-phenyl-p-phenylenediamine | 0.08 |
| 1,2,4-Trihydroxy benzene | 0.08 |
| 6-Amino-m-cresol | 0.08 |
| 2-Chloro-p-phenylenediamine | 0.08 |
| Methylimidazolium propyl p-phenylenediamine | 0.08 |
| 4-Formyl-1-methylquinolinium-p-toluenesulfonic acid | 0.1 |
| 2,3-Indoline dione | 0.1 |
| 5-Amino-6-chloro-o-cresol | 0.1 |
| 2,6-Diaminopyridine | 0.1 |
| 3-Amino-2,6-dimethylphenol | 0.1 |
| 2,6-Dihydroxyethylaminotoluene | 0.1 |

TABLE 11

| Oxidation dye formulation example od-E | (mass %) |
|---|---|
| Catechol | 0.08 |
| Hydroquinone | 0.08 |
| Pyrogallol | 0.08 |
| Gallic acid | 0.08 |
| 2,2'-[(4-Aminophenyl)imino]bisethanol | 0.08 |
| Tannic acid | 0.08 |
| 2,4-Diaminophenol | 0.08 |
| Meta-phenylenediamine | 0.1 |
| Diphenylamine | 0.1 |
| Phloroglucm | 0.1 |
| 3,3'-Diimino diphenol | 0.1 |
| Toluene-3,4-diamine | 0.1 |
| Ortho-aminophenol | 0.1 |
| 5-(2-Hydroxyethylamino)-2-methylphenol | 0.1 |
| N,N'-bis(4-aminophenyl)-2,5-diamino-1,4-quinonedimine | 0.1 |

TABLE 12

| Second part formulation example II-A | (mass %) |
|---|---|
| Hydrogen peroxide | 6.0 |
| Phosphoric acid | Amount for pH 3 |
| Etidronic acid | 0.04 |
| Salicylic acid | 0.01 |
| Sodium lauryl sulfate *15 | 0.2 |
| Cetearyl alcohol | 1.7 |
| Purified water | Balance |

*15 EMAL 10 powder (manufactured by Kao Corporation)

TABLE 13

| Second part formulation example II-B | (mass %) |
|---|---|
| Hydrogen peroxide | 6.0 |
| Phosphoric acid | Amount for pH 3 |
| Cetearyl alcohol | 7.0 |
| Lanoline alcohol | 1.0 |
| Sodium laureth sulfate *2 | 2.8 |
| Etidronic acid | 0.04 |
| Purified water | Balance |

*2 EMAL E-227 (manufactured by Kao Corporation)

TABLE 14

| Second part formulation example II-C | (mass %) |
|---|---|
| Hydrogen peroxide | 6.0 |
| Phosphoric acid | Amount for pH 3 |
| Sodium laureth sulfate *2 | 1.9 |
| Cetyl alcohol | 1.5 |
| Etidronic acid | 0.04 |
| Purified water | Balance |

*2 EMAL E-227 (manufactured by Kao Corporation)

TABLE 15

| Third part formulation example III-A | (mass %) |
|---|---|
| Sodium laureth sulfate *2 | 10.0 |
| 2-Amino-2-methylpropanol | 4.0 |
| HC Red 18 | 0.25 |
| HC Yellow 16 | 1.1 |
| HC Blue 18 | 1.1 |
| Purified water | Balance |

*2 EMAL E-227 (manufactured by Kao Corporation)

TABLE 16

| Combination | Formulation example 1 | Formulation example 2 | Formulation example 3 | Formulation example 4 |
|---|---|---|---|---|
| First part | Formulation example I-A | Formulation example I-B | Formulation example I-B | Formulation example I-C |
| Oxidation dye | Formulation example od-A | Formulation example od-A | Formulation example od-A | Formulation example od-A |
| Second part | Formulation example II-A | Formulation example II-A | Formulation example II-B | Formulation example II-C |
| Third part | Formulation example III-A | Formulation example III-A | Formulation example III-A | Formulation example III-A |

TABLE 17

| Combination | Formulation example 5 | Formulation example 6 | Formulation example 7 | Formulation example 8 |
|---|---|---|---|---|
| First part | Formulation example I-A | Formulation example I-B | Formulation example I-B | Formulation example I-C |
| Oxidation dye | Formulation example od-B | Formulation example od-B | Formulation example od-B | Formulation example od-B |
| Second part | Formulation example II-A | Formulation example II-A | Formulation example II-B | Formulation example II-C |
| Third part | Formulation example III-A | Formulation example III-A | Formulation example III-A | Formulation example III-A |

TABLE 18

| Combination | Formulation example 9 | Formulation example 10 | Formulation example 11 | Formulation example 12 |
|---|---|---|---|---|
| First part | Formulation example I-A | Formulation example I-B | Formulation example I-B | Formulation example I-C |
| Oxidation dye | Formulation example od-C | Formulation example od-C | Formulation example od-C | Formulation example od-C |
| Second part | Formulation example II-A | Formulation example II-A | Formulation example II-B | Formulation example II-C |
| Third part | Formulation example III-1 | Formulation example III-1 | Formulation example III-1 | Formulation example III-1 |

TABLE 19

| Combination | Formulation example 13 | Formulation example 14 | Formulation example 15 | Formulation example 16 |
|---|---|---|---|---|
| First part | Formulation example I-A | Formulation example I-B | Formulation example I-B | Formulation example I-C |
| Oxidation dye | Formulation example od-D | Formulation example od-D | Formulation example od-D | Formulation example od-D |
| Second part | Formulation example II-A | Formulation example II-A | Formulation example II-B | Formulation example II-C |
| Third part | Formulation example III-A | Formulation example III-A | Formulation example III-A | Formulation example III-A |

The invention claimed is:

1. A hair dyeing method, comprising the following (I) and (II):

(I): mixing a first agent comprising an alkali agent and an oxidative dye precursor, a second agent comprising an oxidizing agent, and a liquid hair dye composition as a third agent comprising the following components (A), (B) and (C):

(A) one or more azo dyes selected from the group consisting of the following formulae (A-1), (A-2) and (A-3), in a content of 1.5 mass % or more:

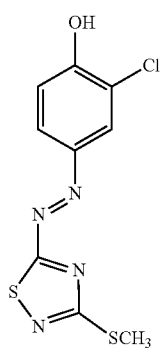
(A-1)

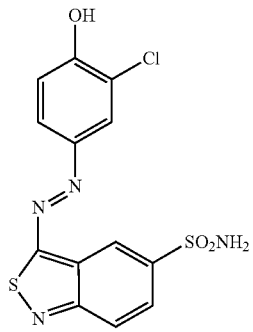
(A-2)

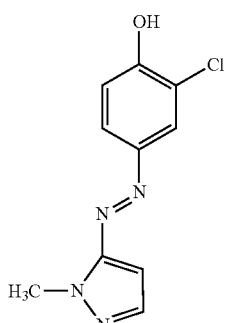
(A-3)

(B) one or more surfactants with an HLB of 7 or more, selected from the group consisting of an anionic surfactant, an amphoteric surfactant, and a polyoxyethylene alkyl or alkenyl ether having an alkyl or alkenyl group with from 12 to 20 carbon atoms, having a polyoxyethylene with an average number of added moles of from 20 to 60; and (C) water;

in a mass ratio of the third agent to a total of the first agent and the second agent, (the third agent/(the first agent+ the second agent), of 0.01 or more and 0.4 or less, to prepare a liquid mixture; and (II): applying the liquid mixture prepared in (I) to hair, wherein said liquid mixture does not contain 2-amino-2-methylpropanol.

2. The hair dyeing method according to claim 1, wherein the liquid hair dye composition further comprises the following component (E) in an amount of 70 mass % or less:

(E) one or more selected from the group consisting of monoalcohols and diols.

3. The hair dyeing method according to claim 1, wherein a content of the component (A) in the liquid hair dye composition is 1.5 mass % or more and 10 mass % or less.

4. The hair dyeing method according to claim 1, wherein a mass ratio of the component (A) to the component (B) in the liquid hair dye composition, (A)/(B), is 0.1 or more and 20 or less.

5. The hair dyeing method according to claim 1, wherein the component (B) is one or more selected from N-acyl amino acid salts, wherein an acyl group of the N-acyl amino acid salts is derived from a fatty acid having a saturated or unsaturated linear or branched chain having from 10 to 18 carbon atoms, and an amino acid moiety of the N-acyl amino acid salts is one selected from the group consisting of glutamic acid and aspartic acid and the amino acid moiety has an L-form.

6. The hair dyeing method according to claim 1, wherein the component (B) is a polyoxyethylene alkyl or alkenyl ether having an alkyl or alkenyl group with from 12 to 20 carbon atoms, and having a polyoxyethylene with an average number of added moles of from 20 to 60.

7. The hair dyeing method according to claim 1, wherein a content of the component (B) in the liquid hair dye composition is 3 mass % or more and 20 mass % or less.

8. The hair dyeing method according to claim 1, wherein the content of the component (B) in the liquid hair dye composition is 5 mass % or more and 15 mass % or less.

9. Hair dyeing method according to claim 1, wherein the mass ratio of the third agent to the total mass of the first agent and the second agent, (the third agent/(the first agent+the second agent) is 0.02 or more and 0.3 or less.

10. The hair dyeing method according to claim 1, wherein the mass ratio of the third agent to the total mass of the first agent and the second agent, (the third agent/(the first agent+the second agent) is 0.03 or more and 0.2 or less.

11. The hair dyeing method according to claim 1, wherein the liquid hair dye composition substantially comprises no cationic surfactant.

12. A liquid hair dye composition comprising the following components (A), (B) and (C):

(A) one or more azo dyes selected from the group consisting of the following formulae (A-1), (A-2) and (A-3):

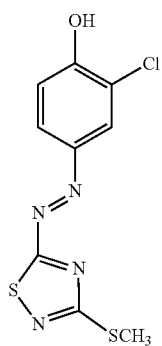

(A-1)

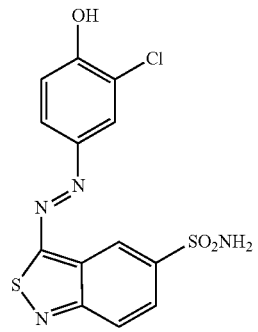

(A-2)

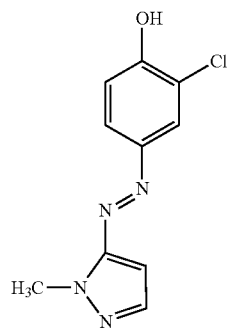

(A-3)

(B) one or more surfactants with an HLB of 7 or more, selected from the group consisting of an anionic surfactant, an amphoteric surfactant, and a polyoxyethylene alkyl or alkenyl ether having an alkyl or alkenyl group with from 12 to 20 carbon atoms, having a polyoxyethylene with an average number of added moles of from 20 to 60; and (C) water;

wherein a content of the component (A) in the liquid hair dye composition is 1.5 mass % or more, wherein said liquid hair dye composition does not contain 2-amino-2-methylpropanol.

* * * * *